Aug. 18, 1959  J. DAUGHERTY  2,899,869
SUSPENSION MECHANISM FOR MACHINE TOOLS
Filed Sept. 2, 1955  6 Sheets-Sheet 6
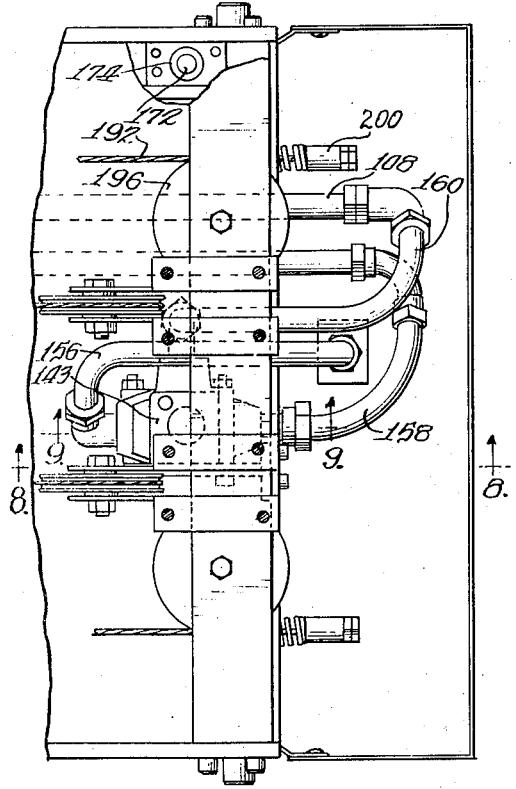
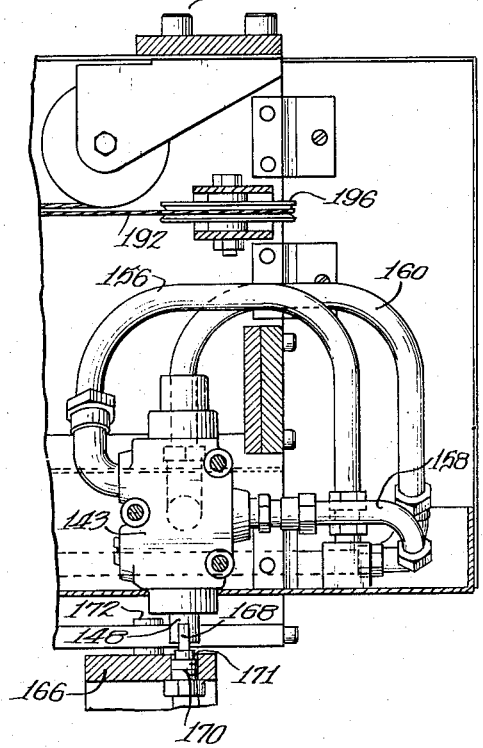
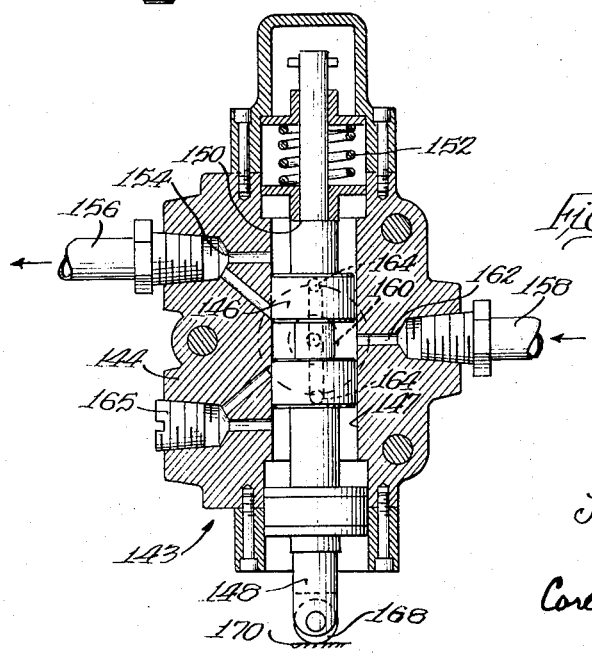
INVENTOR.
Jesse Daugherty
BY
Carlson, Pitzner, Hubbard & Wolfe
Attys.

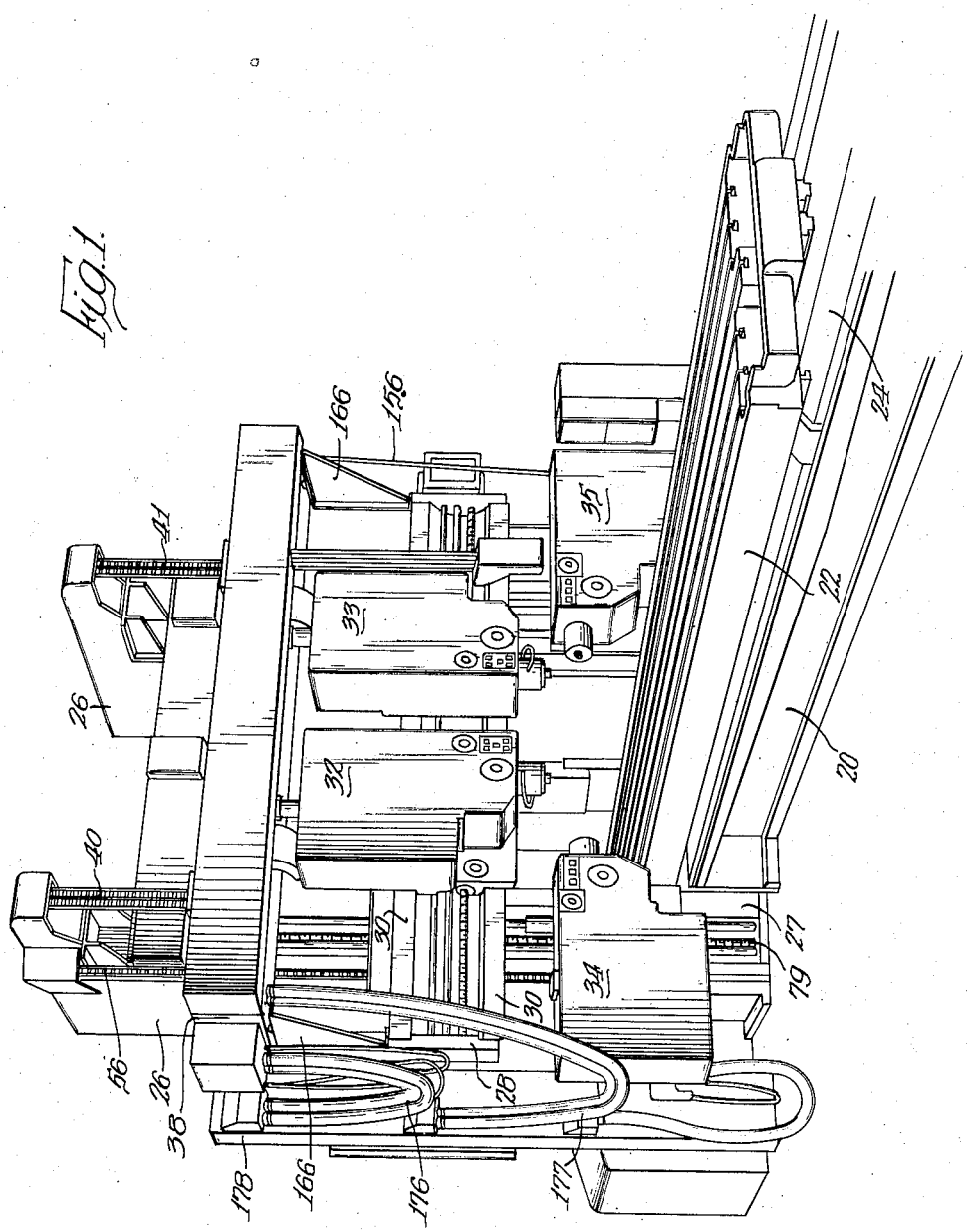

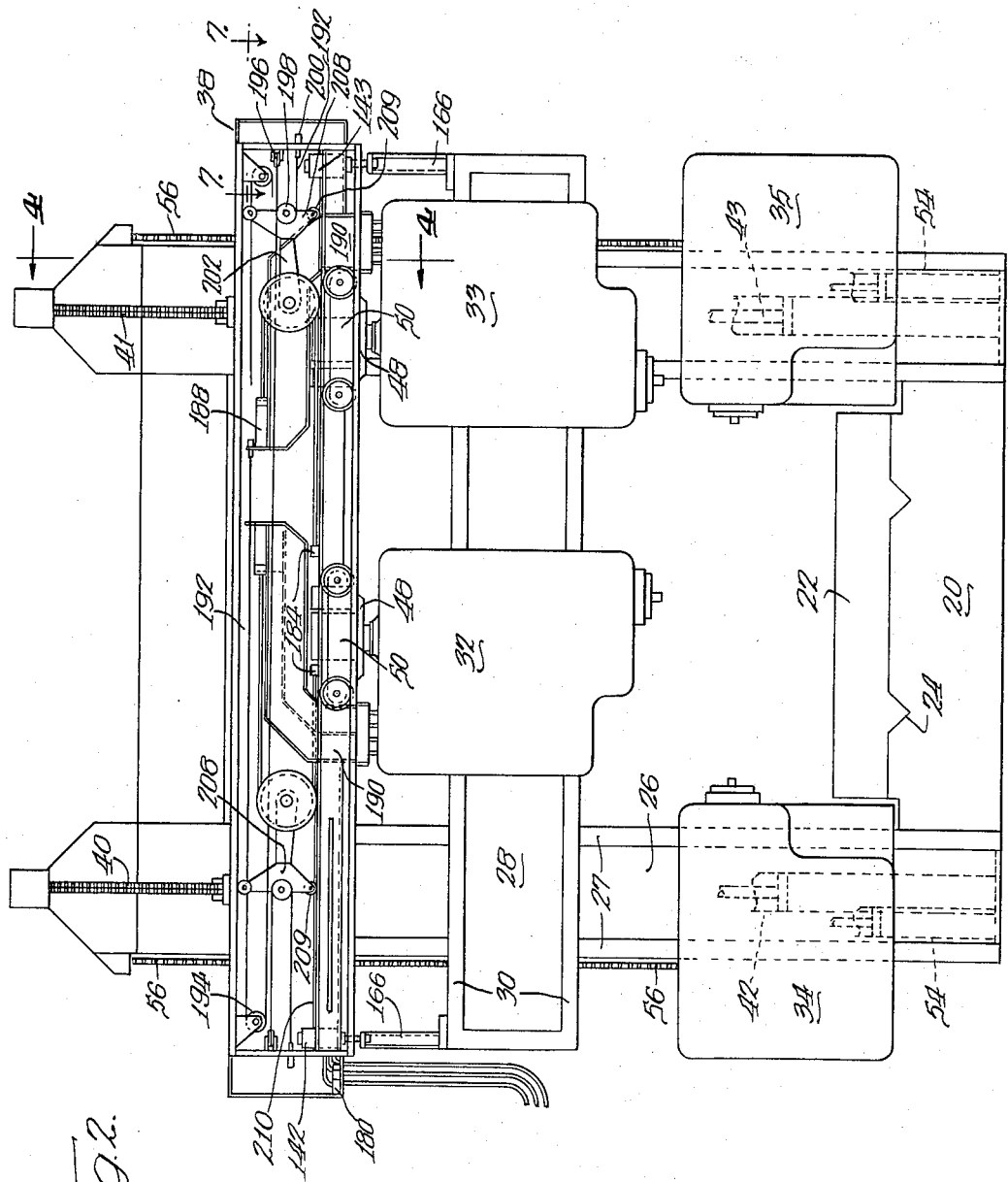

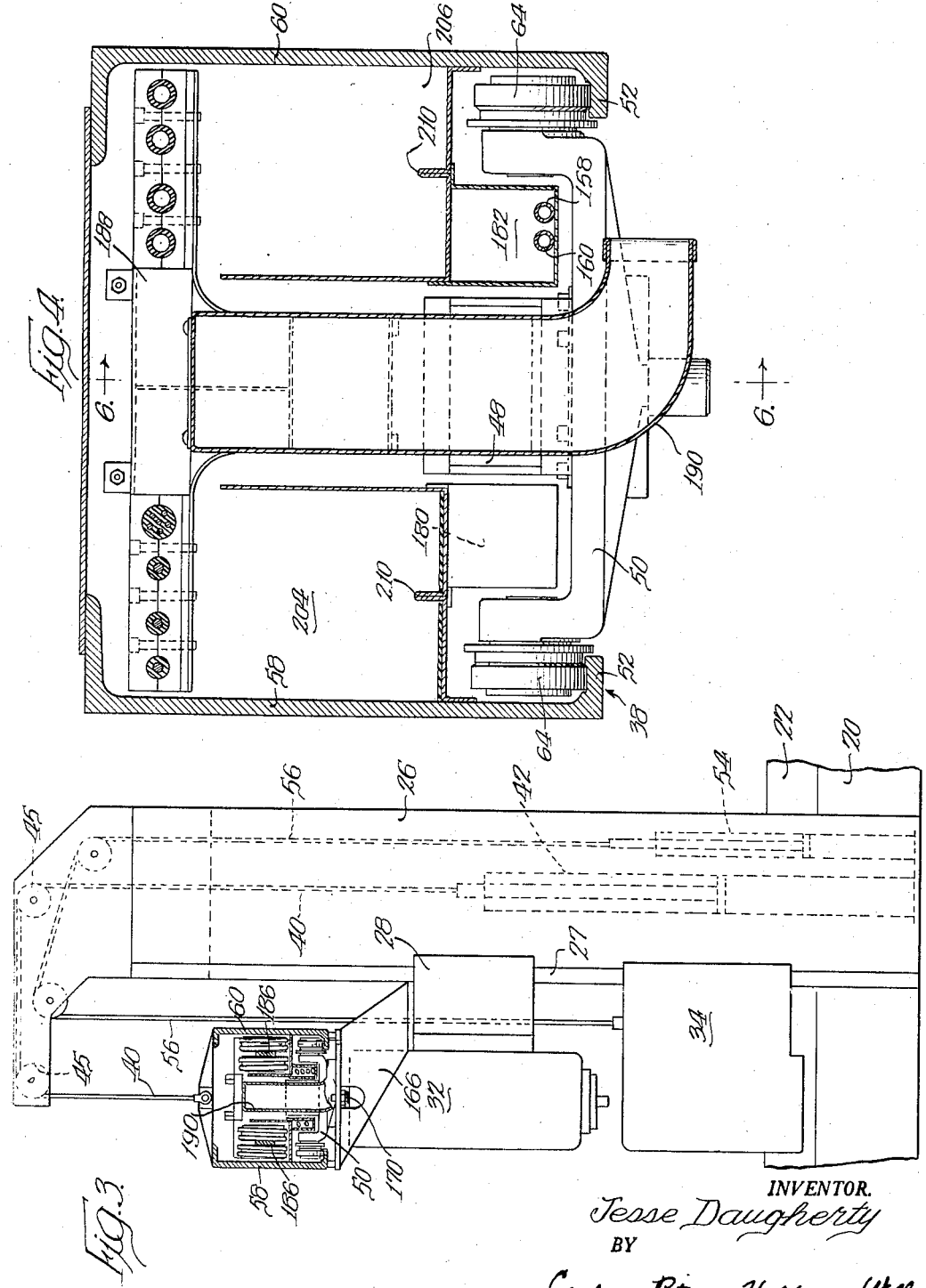

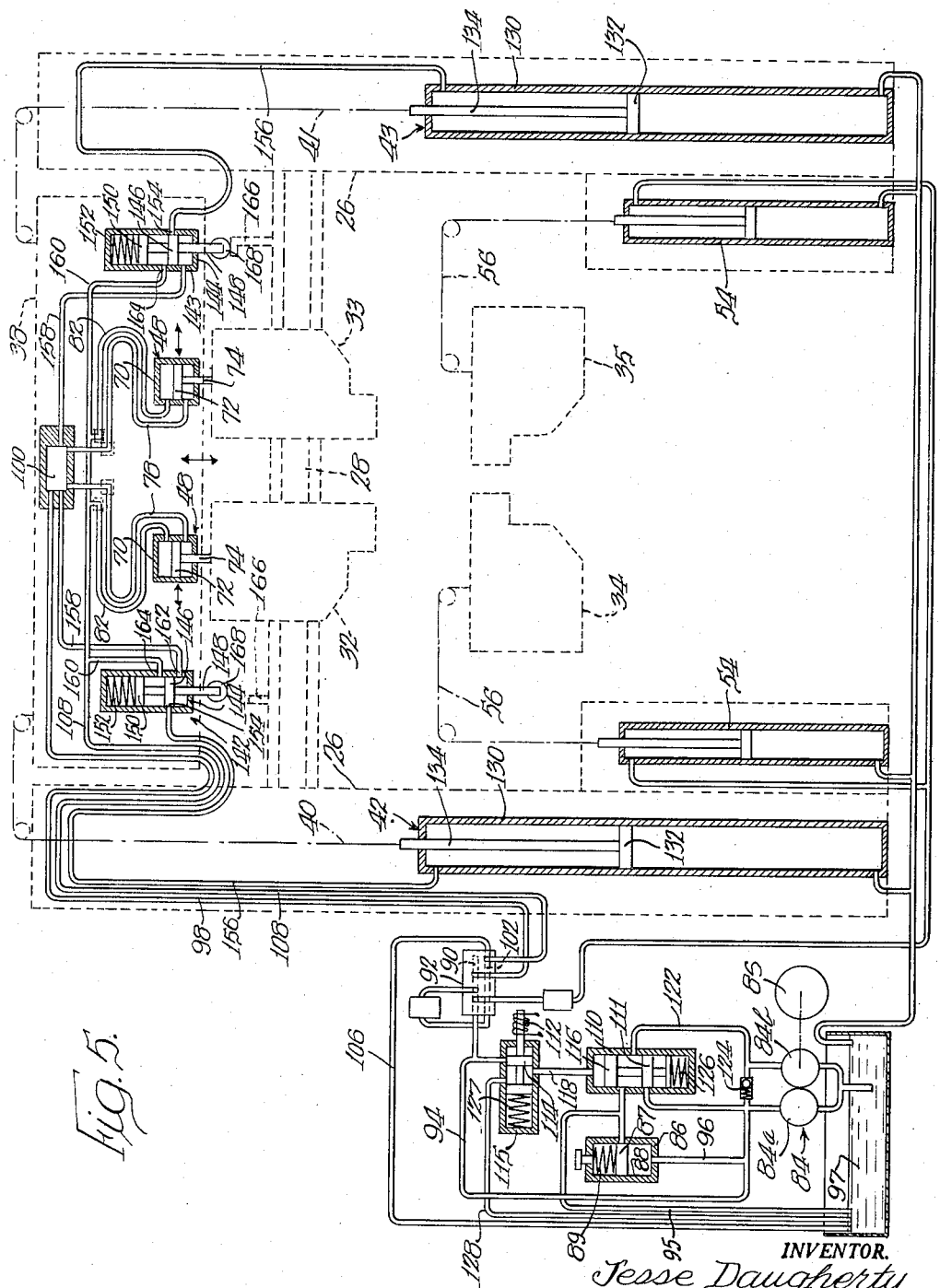

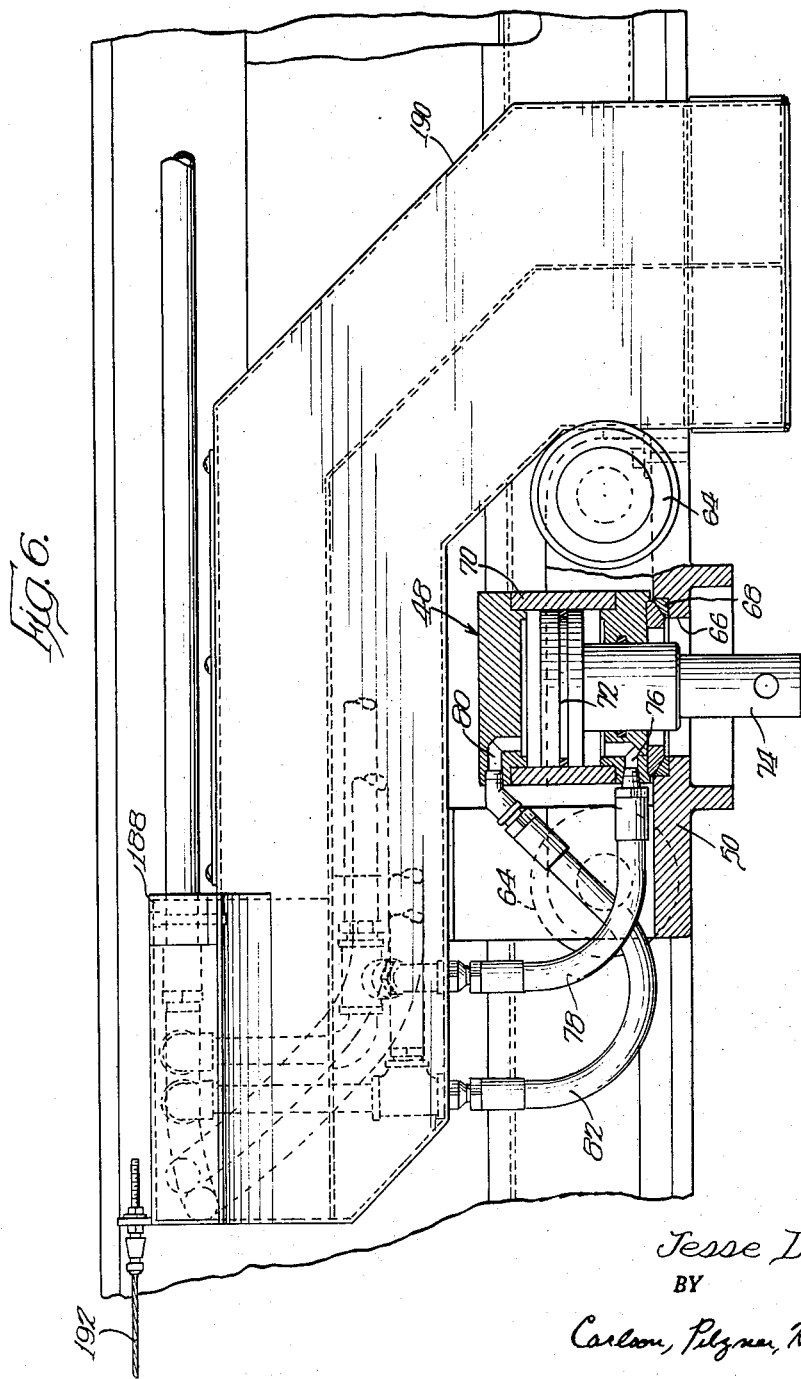

United States Patent Office 2,899,869
Patented Aug. 18, 1959

2,899,869

SUSPENSION MECHANISM FOR MACHINE TOOLS

Jesse Daugherty, Fond du Lac, Wis., assignor to Giddings & Lewis Machine Tool Company, Fond du Lac, Wis., a corporation of Wisconsin Application September 2, 1955, Serial No. 532,172

25 Claims. (Cl. 90—16)

The present invention relates generally to suspension mechanisms for machine tools. More particularly, the invention relates to a hydraulic suspension and supporting mechanism for the movable elements of relatively large machine tools. While the invention is susceptible of use with a variety of machine tools having moving parts which require suspension or support, it finds particular but by no means exclusive utility in planer type milling machines.

Heretofore, planer type milling machines have presented relatively serious alignment problems occasioned by the weight of the milling headstock and its offset or overhanging relationship with respect to the supporting structure upon which it is slidably disposed. Machines of the planer-miller type ordinarily include an elongated bed upon which is supported a reciprocatory supporting table. A pair of vertical side housings or columns extend upwardly at the opposite sides of the bed intermediate its ends and include a horizontal cross-rail extending between them and vertically slidable thereon. A plurality of headstock assemblies are slidably mounted on the cross rail and are movable in a horizontal direction therealong. Vertical movement of the headstock assembly is occasioned by vertical movement of the cross-rail upon which they are mounted.

In machines of this type the headstock assemblies are mounted in an offset position from the cross-rail. If the cross-rail is to form the sole support therefor, the overhang of the headstock assembly represents a considerable weight factor that must be contended with when the machine is in operation, particularly where large machines are concerned having headstock assemblies which weigh as much as six or seven thousand pounds. The cross-rail is not only subjected to a twisting action by virtue of the overhang of the headstock but also undergoes bending and sagging because of the relatively large weight of the headstock assemblies.

The cross-rail, having the headstock assemblies mounted thereon, is moved in a vertical direction by an elevating feed screw. When the headstock assemblies are positioned adjacent one end of the cross-rail, the elevating feed screw and clamp which are nearest to these headstock assemblies will deflect a considerable distance since these elements carry a greater proportion of the weight of the cross-rail assembly. Thus, difficulty has been encountered in maintaining the cross-rail level.

The present invention has been designed to overcome the above noted limitations that are attendant upon the use of planer type milling machines of the character outlined above and toward this end the invention contemplates, as its general aims, the provision of a novel suspension system whereby the weight of the headstock assemblies is effectively supported in any and all of the positions which the headstock is capable of assuming to virtually eliminate the twisting, sagging, and bending of the cross-rail.

A related object of this invention is to provide a suspension system, having the foregoing characteristics, for maintaining the cross-rail level relative to its supporting columns so that wear on the guideways on which the cross-rail is slidably supported is materially reduced, less power is required to feed the cross-rail in its vertical movements, and more accurate machining of the workpiece is possible.

Another object of the invention is the provision of a suspension system of the above type which will compensate for the horizontal position of the headstock assemblies on the cross-rail as well as for the vertical positions of the cross-rail having the headstock assemblies mounted thereon.

A further object is the provision of a suspension system of the foregoing characteristics and in which hydraulic loading means are provided to assume substantially all of the effective weight of the headstock assembly and its associated parts in any adjusted position.

Still another object is to provide a hydraulic suspension system, having the characteristics set forth above, which includes a feed reel mechanism for tensioning, shielding and otherwise protecting flexible conduits utilized to supply power to or to establish control connections with a plurality of translatable machine tool members which have a relatively long range of travel over a common path.

Still a further object of the above invention is to provide a suspension system of the character set forth above which will automatically compensate for any shift in weight of the machine tool cutting element being suspended in order to hold the element in a constant predetermined position relative to the workpiece regardless of cutting loads or the positioning of other cutting elements. A related object of the present invention is to provide a suspension of the type set forth above which will exert a constant total lifting force regardless of the vertical position of the cross-rail or the horizontal positions of the headstock assemblies thereon.

Still another object of the present invention is the provision, in a suspension system of the type set forth, of follow-up means for positioning the suspension mechanism relative to the cross-rail and as a function of the vertical movement of the headstock assembly and cross-rail.

Other objects and advantages will become apparent to those skilled in the art as the following detailed description proceeds, taken in connection with the accompanying drawings, wherein:

Figure 1 is a perspective view of a planer type milling machine including a suspension system embodying the present invention.

Fig. 2 is an elevation view partly in section of a milling machine having a suspension system embodying the present invention.

Fig. 3 is a fragmentary side view, partly in section, of the milling machine shown in Fig. 2.

Fig. 4 is an enlarged fragmentary section taken substantially in the plane of line 4—4 of Fig. 2 and with the supply conduit feed reel omitted.

Fig. 5 is a schematic representation of the hydraulic suspension system embodying the present invention.

Fig. 6 is a fragmentary section taken substantially in the plane of line 6—6 of Fig. 4.

Fig. 7 is an enlarged, fragmentary view taken substantially in the plane of line 7—7 of Fig. 2.

Fig. 8 is an elevation view taken substantially in the plane of line 8—8 of Fig. 7.

Fig. 9 is an enlarged sectional view taken substantially in the plane of line 9—9 of Fig. 7 and showing the three-way follow-up control valve.

While the invention is susceptible of various modifications and alternative constructions, a certain illustrative embodiment has been shown in the drawings and will be described below in detail. It should be understood, however, that there is no intention to limit the invention to the specific form disclosed but on the contrary, the intention is to cover all modifications, alternative constructions, and equivalents falling within the spirit and scope of the invention as expressed in the appended claims.

For the purposes of illustration, the invention has been shown and described herein as embodied in a planer type milling machine. The particular machine chosen for illustration is of relatively large size and the movable elements thereof, particularly the headstock assemblies, are adapted to be displaced throughout relatively large distances while the machine is in operation. Despite this fact, the invention provides for accurate suspension of the weight of the headstock assemblies and indirectly a portion of the weight of the cross-rail upon which the headstocks are slidably disposed.

General organization of the machine

The planer type milling machine selected for illustration of the invention is of a complex nature and since the invention is primarily concerned with a suspension means for the movable headstock unit thereof, only such parts of the machine as are pertinent to the operation of the suspension mechanism have been disclosed. Insofar as practicable, the disclosure of these parts has been of a schematic nature. The planer type milling machine to which the suspension system of the present invention has been applied involves, in its general organization, a main base or bed 20 (Figs. 1 and 2) on which a work supporting table 22 is mounted for rectilinear movement by means of ways 24. A pair of columns or housings 26 defining an upright member extend upwardly from opposite sides of the bed 20 intermediate the ends thereof and are provided with guide ways 27 on their outer faces for supporting and guiding a vertically movable cross-rail 28. The cross-rail 28 is in turn provided with horizontal guide ways 30 for slidably supporting and guiding a pair of milling headstock assemblies 32 and 33 for movement therealong in a horizontal path. A second pair of auxiliary headstock assemblies 34 and 35 are slidably supported on the guide ways 27 of the columns 26 along which they are guided in vertical movement. These auxiliary headstock assemblies 34 and 35 are provided for purposes of machining the sides of workpieces positioned on the machine tool table 22.

The suspension mechanism constituting the present invention is illustrated in the form of a support beam or cross member 38 suspended above and parallel to the cross-rail 28 by means of a pair of roller chains 40 and 41 or the like. Each chain is connected to a hydraulic piston and cylinder type tensioning unit 42 and 43 in each column 26 and passes over a pair of sprocket pulleys 45 on the upper extremities of the machine columns to engage the support beam 38. Each of the headstock assemblies is in turn resiliently supported on the beam 38 by means of a hydraulic suspending unit 48 which is secured to a trolley 50 adapted to roll along tracks 52 forming a part of the beam 38 (Fig. 4).

A separate suspension or counter balancing means is provided for each of the auxiliary side heads 34 and 35. These means are illustrated in the form of a separate hydraulic piston and cylinder mechanism 54 for each of the side heads, located in the corresponding vertical columns 26 and connected to the headstocks by means of roller chains 56 or the like.

As will be made clear presently the suspension mechanism is adapted to sustain substantially the full weight of the headstock units including the headstock assemblies 32 and 33 and their associated feed reel mechanisms, as well as a portion of the weight of the cross-rail 28. Milling machines of the type outlined above and schematically illustrated in Figs. 1 and 2, disregarding the suspension mechanism, are provided with headstock assemblies such as that shown at 32 which are extremely heavy and which therefore present serious problems of alignment of the tool spindle axis. Heretofore it has been common practice in some instances to at least partially correct any misalignment caused by the unbalanced weight of the headstock assembly by corrective machining of the cross-rail way surfaces 30. For example, it has been found that if the way surfaces are machined to provide a crown extending completely along the cross-rail 28, the sag ordinarily caused by the extreme weight of the headstock assembly will be to a certain extent neutralized. Such machining operations are, however, performed for normal or average working conditions and since the sag caused by the weight of a single headstock assembly or more than one headstock assembly is ordinarily greater when the assembly is medially disposed between the column 26 than when it is close to one column or the other. Such corrective attempts to neutralize sagging of the headstock assemblies 32 and 33 and consequent misalignment of the tool spindles are not reliable under varying working conditions.

The hydraulically supported suspension mechanism disclosed herein overcomes the limitations that are inherent in machines having elements correctively formed to compensate for sag and torsional deflections. The mechanism disclosed herein also overcomes limitations inherent in machines where sag and torsional deflections are minimized by making the machine elements of excessive size and weight. Moreover, the system of the present invention functions entirely under the control of the horizontal movements of the headstocks and the vertical movements of the cross-rail.

The suspension mechanism in detail

Referring now to Figs. 2, 3, 4 and 6, the overhead beam 38 is of elongated box-like configuration formed by a pair of inwardly facing channel shaped walls 58 and 60. The tracks 52, formed by the inwardly extending flanges on the bottom of the channels, support and guide the headstock trolley assemblies 50 which are provided with a plurality of traction rollers 64 arranged in pairs at each end thereof. In order to provide means for maintaining the headstock suspending piston and cylinder unit 48 the trolley 50 is provided, at its midportion with an opening 66 having an annular bearing surface 68 formed on the upper surface thereof for movably engaging with a similar surface on a pressure fluid cylinder. For purposes of supporting a headstock 32 or 33 a piston 72, reciprocably mounted in the cylinder 70, is provided with a piston rod 74 fixed to the lower surface thereof and extending downwardly through one end of the cylinder 70 and through the opening 66 in the trolley member 50 and is attached to a headstock by means of a bolt or the like. A resilient supporting action is provided by supplying pressure fluid to the cylinder 70 through a port 76 therein so that a lifting force is exerted on the piston 72.

The use of such a pressure fluid suspending unit 48 with each headstock provides a floating or resilient coupling between the headstock assemblies 32 and 33 and the support beam 38. Pressure fluid is supplied to the cylinders 70 at a pressure sufficient to exert a lifting force on the piston 72 therein equal to the entire weight of the respective headstocks 32 and 33 and a part of the weight of the cross-rail 28. The remaining weight of the cross-rail is carried by the cross-rail elevating feed screws 79 (Fig. 1) which are mounted on the columns 26 adjacent the vertical ways 27 thereon. The piston 72 remains in a static position relative to the cylinder so long as there is no change in either the pressure of the lifting fluid or in the combined weight of the supported headstock and portion of the cross-rail.

For example, if the elevating feed screws 79 are rotated in a direction to raise the cross-rail and headstock assemblies in a vertical direction, they would assume a larger portion of the combined weight of the headstock assemblies and the cross-rail, thereby causing an unbalance in the forces on the pistons 72. When this lifting action occurs the pistons are lifted by the action of the pressure fluid on their undersurface, any pressure fluid in the cylinders 70 above the pistons 72 being exhausted through a port 80 in the upper portion of the cylinders 70 into an exhaust conduit 82. If, on the other hand, the cross-rail and headstock assemblies are lowered by the feed screw, the downward force exerted by the headstock and cross-rail on each piston would be increased, thereby overcoming the upward force exerted by the pressure fluid, and each piston 72 would move downwardly in its respective cylinder 70.

Pressure fluid is supplied to the hydraulic suspension system through a main pressure fluid conduit 78 by means of a hydraulic pump 84 driven by an electric motor 86 (Fig. 5). In the present instance, a vane type two-pressure pump adapted to deliver pressure fluid at either high pressure and low volume or low pressure and high volume is employed as a pressure fluid source. The low volume, high pressure side of the pump 84 is shown as 84a while the high volume, low pressure side is shown as 84b. It should be understood, however, that other types of pumps may be employed, the present two pressure type being shown merely for purposes of illustration. Provision is made for controlling the pressure of the fluid supplied to the headstock suspending unit 48 in order to balance the force exerted on the pistons 72 by the headstock assemblies 32 and 33 and the cross-rail. This is accomplished by an adjustable relief valve 86 comprising a valve spool 87 which is reciprocably mounted in a chamber 88 and serves to relieve the pressure in the system when it exceeds a certain value as determined by a valve spool biasing spring 89. The pressure fluid discharge side of the pump 84 communicates with a manifold 90 in a conduit junction block 92 through a pressure conduit 94, the relief valve communicating with this main pressure line 94 by means of a branch conduit 96 so that any excess pressure therein will be relieved through the relief valve and a discharge conduit 95 to a fluid sump 97. From the pressure manifold 90 a pressure conduit 98 leads to a second valve manifold 100 positioned on the support beam 38 for supplying pressure fluid to the various piston and cylinder suspending units 48. For purposes of discharging fluid from the suspending units, the above described conduit junction block 92 is also provided with an exhaust manifold 102 which communicates with the pressure fluid sump 97 by means of a conduit 106 and with the exhaust conduits 82 from the suspension cylinders 70 through a common conduit 108.

In order to utilize the high volume, low pressure side of the hydraulic pump when a large volume of fluid is required, a pilot operated unloading valve 110 is provided to control the direction of pressure fluid from the high volume side 84b of the pump 84. The unloading valve 110 (Fig. 5) is essentially a three-way pilot operated valve in which a valve spool 111 is positioned to direct the flow of pressure fluid from the high volume, low pressure side 84b of the pump 84 directly, through the discharge conduit 95 to the sump 104 when the low volume high pressure side of the pump is adequate for supplying the demands of the system. When the system requires more volume, however, than the high pressure side of the pump can deliver, a solenoid 112 is actuated to move a pilot valve spool 114 of a three-way pilot valve 115 to direct high pressure fluid against the pilot valve surface 116 of the unloading valve 110 through a pilot fluid conduit 118. This pilot pressure moves the valve spool 111 of the unloading valve 110 to a position in which a high volume pressure fluid conduit 122 from the pump 84 communicates with the main pressure conduit 94 thereby equalizing the pressure on both sides of a check valve 124 which normally prevents the entrance into the system of the high volume low pressure fluid. The check valve then opens to supply a large volume of fluid to the system through conduit 94 from the pump 84b. The spool 111 of the unloading valve 110 is biased in an upwardly direction by a spring 126 against which the force on the pilot surface 116 must act in order to shift the position of the unloading valve spool 111. Similarly, the solenoid actuator of the pilot valve 115 acts against a biasing spring 127 which normally holds the pilot valve spool 114 in a position in which the pilot surface 116 of the unloading valve 110 communicates with the sump 97 through a pilot discharge conduit 128.

The tensioning units 42 and 43 for suspending the support beam 38 and thereby the headstock assemblies 32 and 33 and the cross-rail 38, as described above, each comprise a cylinder 130 having a piston 132 reciprocably mounted therein so that the piston rod 134 extends upwardly through the end of the cylinder to engage the suspension chains 40 and 41 respectively. In order to provide for a vertical follow-up movement of the beam corresponding to vertical movements of the cross-rail, provision is made for varying the respective volumes of pressure fluid present in the piston and cylinder tensioning units 42 and 43. This pressure fluid control is accomplished by providing, for each of the tensioning units 42 and 43, a three-way directional control valve 142 and 143 respectively for supplying or discharging the respective pressure fluid to or from cylinders. Each of these valves, of which valve 143 is typical, in general comprises a housing 144 having a valve spool 146 reciprocably mounted in a cylindrical chamber 147 therein and provided with a downwardly extending valve stem 148 projecting through the lower portion of the housing 144 (Figs. 7 to 9). At the opposite end of the valve spool, the stem 148 is provided with a shoulder 150 against which a spring 152 is seated to bias the valve spool 146 downwardly. The valve 143, as well as the valve 142, is of the closed center type in which a cylinder port 154 communicating with a conduit 156 to the chamber of the tensioning unit cylinder 130 above the piston 132 is closed by the valve spool 146 when the spool is in the center position. Disposed on opposite sides of the cylinder port 154 and communicating with the pressure manifold 100 and the exhaust line 108 through conduits 158 and 160 respectively are a pressure port 162 and a discharge port 164. It should be noted that, because both of these are similarly constructed, the reference numerals used for their respective ports and conduits are the same. Furthermore, the valve shown in Figs. 7–9 is constructed for use as a four-way valve, one outlet port being closed by a plug 165 to adapt the valve for use in the present illustrative control system.

It can be seen that because the headstocks 32 and 33 are slidably mounted on the cross-rail 28 which is in turn mounted on the column structure 26, and are also resiliently supported on the trolleys 50 of the guide beam rail 38 which is suspended from the column structure above the cross-rail and headstock, suitable means are provided to insure that the support beam 38 is disposed parallel to and at a given distance above the cross-rail. These means include an upstanding bracket 166 at each end of the cross-rail 28 and in a position to engage a cam surface 168 on the depending valve stem 148 of the positioning valves 142 and 143. Suitable adjusting means such as a set screw 170 having a cam engaging surface 171 are provided on the brackets 166 as well as guide pins 172 on the brackets engaged in corresponding journals 174 in the beam 38. The set screw is adjusted to engage the valve cam surfaces 168 and thereby close the positioning valves 142 and 143 when the support beam is suspended in the position at which it assumes the entire weight of the headstocks 32 and 33 and a portion of the weight of the cross-rail 28. In this position, the headstock supporting pistons 72 are, in effect, floating in their respective cylinders 70 to provide the desired resilient connection between the support beam and the headstocks.

With the above described construction, it can be seen that the occurrence of a separation between the guide beam rail 38 and the cross-rail 28 which is greater or less than that distance at which the positioning valves are in a closed center position will cause the valve spools 146 to move either down or up to thereby control the volume or amount of pressure fluid in the tensioning units 42 and 43. As this volume of fluid changes, the guide beam rail 38 will follow the movement of the cross-rail 28 in an attempt to keep a constant distance between them. Because the movements, under ordinary vertical feed conditions are slow, there is no appreciable lag between the two. If, however, the cross-rail should be moved upwardly at rapid traverse, a switch (not shown) connected to the rapid traverse control switch is adapted to actuate the pilot valve solenoid 112 in order to supply a high volume of pressure fluid to the tensioning unit cylinders 130.

Under this high volume demand condition, the elevating feed screws 79 momentarily assume the weight of the headstocks, relieving the force on the tensioning unit pistons 132, and consequently the magnitude of the pressure in the cylinder 130. The low pressure of the high volume low pressure side 84b of the pump 84 is therefore adequate to supply the volume of pressure fluid necessary to lower the piston 132 in the cylinder 130. When the vertical movement of the cross-rail stops, pressure fluid continues to be supplied or exhausted to the tensioning units 42 and 43 until the cam 168 on the valves 142 and 143 is engaged by contact surface 171 on the upstanding brackets 166 to position the valve spools 146 in the closed center position and effectively seal the pressure fluid in the cylinders 130.

The weight suspended from the support beam 38 is constant for a given number of headstocks. The pressure in the tensioning unit cylinders 130 of the tensioning units 42 and 43 will vary, however, depending upon the horizontal position of the headstocks 32 and 33 on the cross-rail 28. If, for example, the headstocks are symmetrically spaced with respect to the support beam, the fluid pressure in each of the cylinders 130 will be approximately the same. On the other hand, if both headstocks are traversed along the cross-rail so that they are supported at one end of the beam, the pressure in the cylinder closer to that end will naturally be greater to sustain the increased load thereon. Thus, it can be seen that the cylinders act as fixed suspension members when the cylinder conduits 156 are closed, the pressure therein depending entirely upon the location of the headstocks on the cross-rail. It should also be noted that the pressure fluid pump 84 discharges continuously at a maximum fluid pressure equal to or greater than the maximum possible pressure obtainable in either of the tensioning unit cylinders 130 in order to supply pressure fluid to the cylinders when required. Correspondingly, the piston areas of both the tensioning units 42 and 43 and the headstock suspending units 48 are such as to provide the proper amount of lifting force on the suspension chains 56 and the headstocks respectively as described above.

With the foregoing suspension system, it can be seen that a new and novel means has been provided for relieving the feed screws and cross-rail of the weight of the headstocks, and in addition, for following vertical movements of the cross-rail on which the headstocks are guided. Furthermore, the above described system takes into allowance the horizontal positions of the headstocks on the cross-rail, a feature which is not accomplished in a mere counter-balancing system wherein counter weights of fixed size are used, since in the latter systems a horizontal shift of a plurality of headstocks would put a greater overbalancing force on one end thereby resulting in possible twist or bending of the cross-rail and elevating feed screws at that end.

*Feed reel system*

Provision is also made on the support beam 38 for tensioning the flexible hydraulic conduits leading to the headstock supporting cylinders as well as for tensioning the power and utility conduits leading to the headstocks themselves, such as, for example, the electrical, hydraulic and coolant conduits necessary for the operation of the power headstocks and forming a part of the headstock units. In machines where the translatable members, such as headstocks, are moved over relatively long paths, the problem of handling flexible service connections to these translatable members becomes rather acute. This is particularly true where the translatable members have overlapping or common paths of movement, such as the instant headstocks which move along common tracks and over a relatively long range of travel.

In this instance, the feed reel mechanism contained between the walls 58 and 60 of the support beam 38 is of the type shown in my co-pending application, Serial No. 238,295, filed July 24, 1951, and in the application of Schurger and Morgan, Serial No. 484,722, filed January 28, 1955.

The supply conduits, including hydraulic fluid and coolant conduits 176 or the like and various electrical power and control lines 177, lead from a hose tower 178 (Fig. 1) at one end of the support beam 38 where the fluid conduits terminate in a suitable junction block 180 (Fig. 2). Referring now to Fig. 4, the various lines and conduits pass through longitudinal spaced apart chambers 180 and 182 in the beam 38 to junction and distributing blocks located at the center thereof, one of which 100 is shown in Fig. 5 for the pressure fluid control lines of the suspension system. From these various distributing blocks the conduits which are secured to the beam housing 38 by means of brackets 184 pass around movable sheaves 186 and are then secured to distributing trays 188 extending laterally from conduit hoods 190. The hoods 190, are mounted on the headstock supporting trolleys and serve to direct the various supply conduits downwardly from the support beam, between the trolley tracks 52, to appropriate conduit junctions on the headstocks 32 and 33. Between the hose tower and the end of the support beam there is sufficient slack in the various supply conduits to enable the beam to move in a vertical direction without interference from them. The movable sheaves 186 and hood 190 adapt the supply conduits for following the horizontal movement of the various headstocks along the cross-rail 28 without fouling. Sufficient conduit lengths are provided so that both headstocks 32 and 33 may traverse the entire length of the cross-rail between the upstanding columns 26 to cover the entire surface of a workpiece mounted on the reciprocating table 22.

For the purpose of tensioning the feed reels or sheaves and the conduits carried thereon in order to prevent the conduits from becoming slack and being entangled in the trolleys, a tensioning arrangement is employed which is of the form shown in the co-pending application Serial No. 484,722 mentioned above. Briefly, this tensioning arrangement, which is adapted to continuously urge each sheave to pull against the various supply conduits thereon, comprises a cable and pulley arrangement which is effective to roll the sheave or sheaves along their respective paths during traversing movements of the carriage. An illustrative feed reel tensioning arrangement is shown in Fig. 2 for one hood and sheave. It should be understood, however, that a similar feed reel is employed for the remaining hood. This tensioning arrangement comprises a flexible cable 192 which is fastened to the hood tray 188 on the side thereof opposite from that at which the supply conduits are secured. The cable 192 is carried away from the hood tray and supply conduits to the other end of the support beam where it passes over a pulley 194 and thence back parallel to itself to the other end of the housing where it passes over a second pulley 196 again returning parallel to itself. From this point, the cable 192 passes around a third pulley 198 and returns to the end of the support beam, adjacent the second mentioned pulley 196, where it is secured to the end of the beam 38 by a suitable clamping means 200. The third mentioned pulley 198 is operatively coupled by means of a link 202, with a feed reel or sheaves 186 which carry the supply conduits to the tray 188 on which the cable was initially secured. The sheaves for the electrical and hydraulic conduits are positioned in longitudinal chambers 204 and 206 respectively (Fig. 4) and are guided therein by means of guide fins 208 having guide wheels 209 therein which ride on tracks 210 in the lower part of the chambers 204 and 206.

The above described feed reel tensioning device is supplied for each hood and pair of sheaves, there being a hood and pair of sheaves for each of the headstocks, two of which are shown as illustrative of the present invention. With the above described feed reel tensioning arrangement, each of the headstocks 32 and 33 can traverse the entire length of the cross-rail 28 without interference from the conduits or tensioning devices of the other so that both of the headstocks may be positioned adjacent one of the vertical machine columns 26.

I claim:

1. A suspension mechanism for use with a machine tool having a plurality of headstocks guidably mounted for horizontal movement on a vertically movable cross-rail extending between a pair of upright columns disposed on opposite lateral sides of a reciprocatory table, said suspension mechanism comprising, in combination, a support beam disposed above the headstocks and overlying the path of movement thereof for carrying the weight of the headstocks and relieving the cross-rail from carrying the same, means on said machine tool for adjustably suspending said beam from the columns, a track on said beam, trolleys movable along said track for supporting the headstocks, means connecting the headstock to the trolley, and means on said beam for vertically adjusting said suspending means when the cross-rail is moved in a vertical direction relative to said beam whereby the headstocks are continuously supported by the trolleys for horizontal movement on the cross-rail relative to the table.

2. In a machine tool including a tool holder movable in vertical and horizontal paths, a tool holder suspension mechanism comprising a track disposed above the level of said tool holder and overlying the path of horizontal movement thereof, means for adjustably suspending said track from the machine tool, a trolley movable on said track and adapted to traverse the same, means mounted on said trolley for resiliently supporting the tool holder, and means operative in response to a vertical movement of the tool holder for adjusting said suspending means to vertically position said track above the tool holder.

3. A tool holder suspension mechanism for a machine tool and comprising, in combination, a track disposed at a predetermined distance above the level of said tool holder overlying the path of movement thereof, means for adjustably suspending said track from the machine tool and for applying a lifting force on each end of said track to take up the combined weight of said track and the tool holder, a trolley positioned on said track and adapted to traverse the same, means mounted on said trolley for resiliently supporting the tool holder, and means on said track responsive to relative movement between said track and the tool holder for causing said adjustable supporting means to apply a corrective lifting force to said track whereby said predetermined distance between said track and the tool holder remains constant.

4. A suspension mechanism for a tool holder on a machine tool and comprising, in combination, a track disposed above the level of said tool holder overlying the path of movement thereof, means for adjustably suspending said track from the machine tool and for applying a lifting force on each end of the track to take up the combined weight of the track and the tool holder, a trolley positioned on said track and adapted to traverse the same, and means mounted on said trolley for resiliently supporting the tool holder.

5. In a machine tool, the combination comprising a pair of spaced vertical columns, a horizontal rail mounted on the front of the columns for vertical movement thereon, a headstock attached to the front of said rail for horizontal movement therealong, a pair of forwardly extending projections on the upper ends of the respective columns, a horizontal trolley rail, means adjacent each end of said trolley rail for adjustably suspending said trolley rail from the front end of said projections in overlying relation to the path of movement of said headstock, a trolley movable along said trolley rail, means for resiliently suspending said headstock on said trolley rail and means for tensioning said adjustable suspending means to support the weight of the headstock and the trolley rail, said tensioning means applying a counterbalance force to each end of said suspending means in accordance with the distribution of headstock weight along the trolley rail to compensate for unbalance as a result of the headstock shifting along the trolley rail towards one end or the other thereby to maintain the trolley rail horizontal.

6. A headstock suspension mechanism for use with a planar type milling machine having a workpiece supporting table translatable beneath a headstock guidably positioned on a cross-rail for both vertical and horizontal adjustment relative to the workpiece, said suspension mechanism comprising, in combination, a support beam, a piston and cylinder mechanism for adjustably suspending said beam from said machine in overlying relation to the path of movement of the headstock, a track on said beam, a trolley movable along said track for horizontal positioning relative to the workpiece, a piston and cylinder mechanism mounted on said trolley for resiliently suspending the headstocks from the beam, a pressure fluid supply source, a plurality of conduits from said supply source for supplying and discharging pressure fluid from both of said suspending mechanisms to position said pistons in said cylinders, and a feed reel mechanism in said support beam for tensioning the pressure fluid supply and discharge conduits for said trolley mounted piston and cylinder mechanism.

7. A headstock suspension mechanism for use with a planar type milling machine having a workpiece supporting reciprocatory table translatably mounted beneath a headstock positioned on a cross-rail for both vertical and horizontal adjustment relative to the workpiece, said suspension mechanism comprising, in combination, a support beam, pressure fluid means for adjustably suspending said beam from said machine in overlying relation to the path of movement of the headstock, a track on said beam, a trolley movable along said track for horizontal positioning relative to the workpiece, pressure fluid means mounted on said trolley for resiliently suspending the headstocks from the beam, a pressure fluid supply source, a plurality of conduits for supplying and discharging pressure fluid from both of said suspending means, a feed reel mechanism in said support beam for tensioning the pressure fluid supply and discharge conduits for said trolley mounted pressure fluid means, and means operative in response to vertical movements of the cross-rail for adjusting said beams suspending means to vertically position said support beam above the cross-rail.

8. In a machine tool having a reciprocatory table for supporting a workpiece, the combination comprising a pair of spaced vertical columns disposed on opposite lateral sides of the bed, a horizontal cross-rail mounted on the front of the columns for vertical movement thereon relative to the workpiece, a tool head attached to the front of the rail for horizontal movement therealong, a pair of forwardly extending projections on the upper ends of the respective columns, a horizontal support beam, means for adjustably suspending said beam from the front end of said projections in overlying relation to the path of movement of the tool head, a pair of longitudinal tracks on said beam, a trolley movable along said tracks for suspending the tool head from the trolley, and means for tensioning said suspending means for counter-balancing the combined weight of the tool head and the beam in accordance with the distribution of tool head weight along said support beam to compensate for unbalance as a result of the tool head shifting along said support beam towards one end or the other thereby to maintain said support beam horizontal.

9. A suspension mechanism for use with a machine tool having a headstock guidably mounted for horizontal movement on a vertically movable cross-rail extending between a pair of upright columns disposed on opposite lateral sides of a reciprocatory table and serviced by a plurality of control and utility conduits, said suspension mechanism comprising, in combination, a support beam disposed above the headstock and coextensive with the path of movement thereof, means on said machine tool for adjustably suspending said beam, a track on said beam, a feed reel mechanism on said beam adjacent said track for tensioning said conduits, a trolley movable along said track for supporting the headstock, means on said trolley for receiving said service conduits and conducting the same to the headstock, and means on said beam for vertically adjusting said suspending means when the cross-rail is moved in a vertical direction and in accordance with the distribution of tool head weight along said support beam to compensate for unbalance as the result of the tool head shifting along said support beam whereby the headstock is continuously supported on the trolley and serviced by the control and utility conduits.

10. A headstock suspension mechanism for use with a machine tool having an upright member and a headstock mounted thereon for horizontal and vertical movement and having a center of gravity shiftable horizontally relative to the upright member, said suspension mechanism comprising, in combination, a support beam suspended from the upright member substantially coextensive with the path of horizontal movement of the headstock, means for supporting the headstock from the beam for horizontal movement therealong and for supporting the weight of the headstock, a pair of suspension elements spaced apart and secured at one end to the support beam for suspending the same from the upright member, said suspension elements being positioned on opposite horizontal sides of the center of gravity of the headstock, and a counterbalance member secured to the other end of each of said suspension elements for exerting a lifting force to take up the combined weight of the headstock and said support beam, said counterbalance member exerting a lifting force on each of said suspension elements in accordance with the distribution of headstock weight as determined by the horizontal position of the center of gravity of the headstock relative to said support beam thereby to compensate for unbalance of the head stock and maintain the same in a horizontal position relative to the upright member.

11. A headstock suspension mechanism for use with a machine tool having an upright member and a headstock mounted thereon for horizontal and vertical movement and having a center of gravity shiftable horizontally relative to the upright member, said suspension mechanism comprising, in combination, a support beam adjustably suspended from the upright member substantially coextensive with the path of horizontal movement of the headstock and disposed at a predetermined distance above the level of horizontal travel of the headstock, means for supporting the headstock from the beam for horizontal movement therealong and for resiliently supporting the weight of the headstock, a pair of adjustable suspension elements spaced apart and secured at one end to the support beam for adjustably suspending the same from the upright member, said suspension elements being positioned on opposite horizontal sides of the center of gravity of the headstock, a counterbalance member secured to the other end of each of said suspension elements for exerting a lifting force to take up the combined weight of the headstock and said support beam, and means responsive to vertical movement between said beam and the headstock for causing said counterbalance and said adjustable suspension elements to correct the lifting force applied to said beam, said counterbalance member exerting a lifting force on each of said suspension elements in accordance with the distribution of headstock weight as determined by the horizontal position of the center of gravity of the headstock relative to said support beam thereby to compensate for unbalance of the headstock and maintain the same in a horizontal position relative to the upright member by maintaining constant said predetermined distance between the headstock and said support beam.

12. A headstock suspension mechanism for use with a machine tool having a pair of spaced upright columns, a cross-rail extending between the columns and vertically movable thereon, and a headstock mounted for horizontal movement along the cross-rail, said suspension mechanism comprising, in combination, a support beam extending between the columns and substantially coextensive with the cross-rail for carrying the weight of the headstock and relieving the cross-rail from bearing the weight of the same, means for suspending the headstock from said beam for movement therealong, means adjacent each end of the support beam for suspending the same from the columns, said means exerting a lifting force to take up the combined weight of the support beam and the headstock, and means for varying the lifting force applied to each end of the support beam in accordance with the distribution of headstock weight along the support beam to compensate for unbalance as a result of the headstock shifting along the support beam towards one end or the other thereby to maintain the support beam horizontal.

13. A headstock suspension mechanism for use with a machine tool having a pair of spaced upright columns, a cross-rail extending between the columns and vertically movable thereon, and a headstock mounted for horizontal movement along the cross-rail, said suspension mechanism comprising, in combination, a support beam extending between the columns substantially coextensive with the cross-rail for carrying the weight of the headstock and relieving the cross-rail from bearing the weight of the same, said beam being disposed at a predetermined distance above the cross-rail, means for resiliently suspending the headstock from said beam for movement therealong, means adjacent each end of the support beam for adjustably suspending the same from the columns, said means exerting a lifting force to take up the combined weight of the support beam and the headstock, and means responsive to relative vertical movement between said beam and the cross-rail on which the headstock is mounted for causing said suspending means to vary the lifting force applied to each end of the support beam to compensate for unbalance as a result of the headstock shifting along the support beam towards one end or the other thereby to maintain the support beam horizontal and to maintain constant said predetermined distance.

14. A headstock suspension mechanism for use with a machine tool having an upright member and a headstock means mounted thereon for horizontal and vertical movement and having a center of gravity shiftable horizontally relative to said upright member, said suspension mechanism comprising, in combination, a pair of suspension elements spaced apart and secured to the headstock means on opposite horizontal sides of the center of gravity thereof, and a counterbalance for exerting a lifting force to take up the weight of the headstock means, said counterbalance exerting a lifting force on each of said suspension elements in accordance with the distribution of headstock weight on the upright member as a result of a horizontal shift in the center of gravity of the headstock means to compensate for unbalance of the headstock means on the upright member and maintain the headstock means in a horizontal position on the upright member.

15. A headstock counterbalancing mechanism for use with a machine tool having an upright member, a headstock mounted thereon for horizontal and vertical movement and having a center of gravity shiftable horizontally relative to the upright member, said counterbalancing mechanism comprising, in combination, a hollow support beam supported on the upright member and overlying the path of horizontal movement of the headstock, said beam having a pair of longitudinally extending spaced tracks therein defining a slot, a wheeled trolley in said beam movable along said tracks, means extending through said slot and between said trolley and headstock supporting the headstock on the trolley for horizontal movement along the beam, a counterbalance element supporting each end of the support beam, and means for exerting a counterbalancing force on each element to take up the combined weight of the headstock and said support beam, said means exerting a counterbalancing force on each of said elements in accordance with the distribution of headstock weight as determined by the horizontal position of the center of gravity of the headstock relative to said support beam thereby to compensate for unbalance of the headstock and maintain the same in a horizontal position relative to the upright member.

16. A headstock suspension mechanism for use with a machine tool having an upright member, a cross-member mounted thereon for vertical movement, and a headstock means mounted on the cross member for horizontal movement and having a center of gravity with shifts horizontally relative to said upright member, said suspension mechanism comprising, in combination, a pair of suspension elements spaced apart and secured to the cross member on opposite horizontal sides of the center of gravity of the headstock, and a counterbalance means for exerting a lifting force to take up the weight of the cross member and the headstock means, said counterbalance exerting a force on each of said suspension elements in accordance with the distribution of headstock weight on the upright member as a result of a horizontal shift in the center of gravity of the headstock means on the cross member thereby to compensate for unbalance of the headstock means relative to the upright member and maintain the headstock means in a horizontal position on the upright member.

17. In a machine tool having an upright member, a cross member mounted for vertical movement on said upright member, and a headstock mounted to move horizontally along said cross member relative to the upright member and so mounted that the weight of the same is carried by the cross member, means for supporting the cross member and headstock so as to compensate for unbalance resulting from the headstock shifting along the cross member toward one end or the other thereby to maintain the headstock in alinement with the upright member, said means comprising, in combination, a counterbalance element supporting each end of the cross member, means for exerting a counterbalancing force connected to each element, and means for controlling said force exerting means in accordance with the distribution of headstock weight along said cross member thereby to increase the counterbalancing force at one end of the cross member when the headstock moves toward that end, and to reduce correspondingly the counterbalancing force at the other end of the cross member.

18. A headstock counterbalancing mechanism for use with a machine tool having an upright member, a cross-rail mounted on said upright member for vertical movement, a headstock mounted on said cross-rail for horizontal movement and having a center of gravity shiftable horizontally relative to the upright member, said counterbalancing mechanism comprising, in combination, a support beam supported on the upright member overlying the path of horizontal movement of the headstock, means for supporting the headstock on the beam for horizontal movement therealong, a counterbalance element supporting each end of the support beam, a source of pressure fluid, pressure fluid means for exerting a counterbalancing force on each element to take up the combined weight of the headstock and said support beam, and a pair of three-way valves connected to said source of pressure fluid and supported in spaced relation on said beam in operative engagement with the cross-rail and positionable in response to relative movement between said beam and the cross-rail for controlling the application of pressure fluid on each pressure fluid means to correct the lifting force applied to said beam by said counterbalance elements in accordance with the distribution of headstock weight as determined by the horizontal position of the center of gravity of the headstock relative to said support beam thereby to compensate for unbalance of the headstock and maintain the same in a horizontal position relative to the upright member.

19. A headstock suspension mechanism for use with a machine tool having an upright member, a cross member mounted thereon for vertical movement, and a headstock mounted on the cross member for horizontal movement and having a center of gravity which shifts horizontally relative to said upright member, said suspension mechanism comprising, in combination, a pair of suspension elements spaced apart and secured to the cross member on opposite horizontal sides of the center of gravity of the headstock, pressure fluid means for exerting a lifting force on each suspension element to take up the weight of the cross member and the headstock means, a source of pressure fluid, and a pair of three-way valves connected to said source of pressure fluid and supported in spaced relation on the upright member and including valve spools operatively engaging said cross member adjacent each end thereof and positionable in response to vertical movements thereof as the headstock shifts horizontally thereon for controlling the application of pressure fluid on each pressure fluid means in accordance with the distribution of headstock weight on the upright member as a result of a horizontal shift in the center of gravity of the headstock on the cross member thereby to compensate for unbalance of the headstock relative to the upright member and maintain the headstock in a horizontal position on the upright member.

20. In a machine tool having an upright member, a cross member mounted for vertical movement on said upright member, and a headstock mounted to move horizontally along said cross member relative to the upright member and so mounted that the weight of the same is carried by the cross member, means for supporting the cross member and headstock so as to compensate for unbalance resulting from the headstock shifting along the cross member toward one end or the other thereby to maintain the headstock in alinement with the upright member, said means comprising, in combination, a counterbalance element supporting each end of the cross member, a pressure fluid means for exerting a counterbalancing force on each element, a source of pressure fluid and a pair of three-way valve means connected to said source of pressure fluid and supported in spaced relation on the upright member in operative engagement with the cross member and positionable in response to vertical movements thereof as the headstock shifts horizontally thereon for controlling the application of pressure fluid on each pressure fluid means in accordance with the distribution of headstock weight along said cross member thereby to increase the pressure fluid counterbalancing force at one end of the cross member when the headstock moves toward that end, and to reduce correspondingly the pressure fluid counterbalancing force at the other end of the cross member.

21. For use with a machine tool including a pair of spaced vertical columns having a horizontal tool rail mounted for vertical movement thereon and a headstock guidably mounted on the rail for horizontal movement therealong, a headstock suspension mechanism comprising, in combination, a pair of forwardly extending projections on the upper ends of the respective columns, a horizontal trolley rail, means adjacent each end of said trolley rail for adjustably suspending said trolley rail from the front of said projections in overlying relation to thte path of movement of the headstock, a trolley movable along the trolley rail, means for resiliently suspending the headstock from the trolley and means for tensioning said adjustable suspending means for counterbalancing the weight of the headstock and the trolley rail, said tensioning means applying a counterbalance force to each end of said suspending means in accordance with the distribution of the headstock weight along the trolley rail to compensate for unbalance as a result of the headstock shifting along the trolley rail toward one end or the other thereby to maintain the trolley rail horizontal.

22. A suspension mechanism for use with a machine tool having a plurality of heavy individually powered headstock units each of which comprises a headstock guidably mounted for horizontally traversing movement on a vertically movable crossrail extending between a pair of upright columns and an associated feed reel mechanism for directing service lines to the headstock, said suspension mechanism comprising, in combination, a hollow elongated support beam comprising a pair of opposed walls having inwardly extending flanges coextensive with their lower edges defining tracks, panels in said beam defining longitudinally extending chambers spaced above said tracks, means supporting said beam above the headstocks and overlying the path of movement thereof, means for supporting the headstock units on the beam for relieving the cross-rail from carrying the weight of the same, said means including trolleys movable along said tracks having means for resiliently supporting the headstocks and means for receiving one end of the service lines of the headstock units, and a guide means movably supporting the feed reels of said feed reel mechanism in said chambers with the other end of the service lines connected to the beam, and means on said beam for vertically adjusting said suspending means when the cross-rail is moved in a vertical direction relative to said beam whereby the headstock units are continuously supported by the beam for horizontal movement on the cross-rail.

23. A suspension mechanism for use with a machine tool having a heavy individually powered headstock unit which comprises a headstock guidably mounted for horizontal traversing movement on a vertically movable cross-rail extending between a pair of upright columns and an associated feed reel mechanism for directing service lines to the headstock, said suspension mechanism comprising, in combination, a hollow elongated support beam extending between the columns substantially coextensive with the cross-rail and for carrying the weight of the headstock unit and relieving the cross-rail from bearing the weight of the same, said support beam comprising a pair of opposed walls having outwardly extending flanges coextensive with their lower edges defining tracks, panels in said beam defining longitudinally extending chambers spaced above said tracks, being disposed at a predetermined distance above the cross-rail, means supporting the headstock unit on the support beam for movement therealong, said means including a trolley movable along said tracks having means for resiliently suspending the headstock and means for receiving one end of the service lines of the headstock units, and a guide means movably supporting the feed reels of said feed reel mechanism in said chambers with the other end of the service lines connected to the beam, means adjacent each end of the support beam for adjustably suspending the same from the columns, said means exerting a lifting force to take up the combined weight of the support beam and the headstock, and means responsive to relative vertical movement between said beam and the cross-rail on which the headstock is mounted for causing said suspending means to vary the lifting force applied to each end of the support beam to compensate for unbalance as a result of the headstock shifting along the support beam towards one end or the other thereby to maintain the support beam horizontal and to maintain constant said predetermined distance.

24. A suspension mechanism for a tool holder on a machine tool comprising, in combination, a support beam disposed above the level of said tool holder, means on said beam defining a track overlying the path of movement of the tool holder, means for adjustably suspending said beam and for applying a lifting force on each end of the beam to take up the combined weight of the beam, the track, and the tool holder, a trolley positioned on said track and adapted to traverse the same, and means mounted on said trolley for resiliently supporting the tool holder.

25. A headstock suspension mechanism for use with a machine tool having an upright member and a headstock means mounted thereon for horizontal and vertical movement and having a center of gravity shiftable relative to said upright member, said suspension mechanism comprising, in combination, a support beam disposed above the headstock and overlying the path of horizontal movement thereof, means for suspending the headstock from said beam for movement therealong, counterbalance means secured to the ends of said beam at opposite extremities of headstock movement therealong for exerting a lifting force to take up the weight of the headstock means, said counterbalance means exerting a lifting force on each end of said beam in accordance with the distribution of headstock weight relative to the upright member as a result of a horizontal shift in the center of gravity of the headstock means to compensate for unbalance of the headstock means on the upright member and maintain the headstock means in a horizontal position.

References Cited in the file of this patent

UNITED STATES PATENTS

| | | |
|---|---|---|
| 2,208,804 | Pfauter | July 23, 1940 |
| 2,260,157 | Zwick | Oct. 21, 1941 |
| 2,393,696 | Kraut et al. | Jan. 29, 1946 |
| 2,464,415 | Philippe | Mar. 15, 1949 |
| 2,696,763 | Daugherty | Dec. 14, 1954 |